(12) United States Patent
Jin et al.

(10) Patent No.: US 10,882,279 B2
(45) Date of Patent: Jan. 5, 2021

(54) ORGANIC-INORGANIC ADHESIVE COMPOSITION AND GAS BARRIER FILM AND METHOD FOR PRODUCING SAME

(71) Applicant: TORAY ADVANCED MATERIALS KOREA INC., Gyeongsangbuk-do (KR)

(72) Inventors: Sang Woo Jin, Gyeongsangbuk-do (KR); Jun Woo Park, Gyeongsangbuk-do (KR); Kwang Hoi Lee, Gyeongsangbuk-do (KR); Sang Yeol Um, Gyeongsangbuk-do (KR); Ji Hoon Lee, Gyeongsangbuk-do (KR)

(73) Assignee: TORAY ADVANCED MATERIALS KOREA INC., Gyeongsangbuk-Do (KR)

( * ) Notice: Subject to any disclaimer, the term of this patent is extended or adjusted under 35 U.S.C. 154(b) by 119 days.

(21) Appl. No.: 16/068,727

(22) PCT Filed: Dec. 30, 2016

(86) PCT No.: PCT/KR2016/015595
§ 371 (c)(1),
(2) Date: Jul. 9, 2018

(87) PCT Pub. No.: WO2017/119680
PCT Pub. Date: Jul. 13, 2017

(65) Prior Publication Data
US 2019/0016092 A1    Jan. 17, 2019

(30) Foreign Application Priority Data
Jan. 8, 2016  (KR) .................. 10-2016-0002674

(51) Int. Cl.
*B32B 15/08*    (2006.01)
*C09D 201/10*   (2006.01)
(Continued)

(52) U.S. Cl.
CPC ............ *B32B 15/08* (2013.01); *B32B 7/12* (2013.01); *B32B 9/00* (2013.01); *B32B 9/04* (2013.01);
(Continued)

(58) Field of Classification Search
CPC .. B32B 7/00–7/14; B32B 27/00–27/42; C09D 175/00–175/16;
(Continued)

(56) References Cited

U.S. PATENT DOCUMENTS 6,743,512 B2 *  6/2004  Murata .............. C08G 18/289
                                              428/423.1
6,765,055 B2    7/2004  Miyata et al.
(Continued)

FOREIGN PATENT DOCUMENTS

EP       0347711 A2 * 12/1989 ............ C08G 18/70
JP       2001-205728 A    7/2001
(Continued)

OTHER PUBLICATIONS

Machine translation of JP2012-223919. Retrieved Jan. 13, 2020.*
(Continued)

*Primary Examiner* — Prashant J Khatri
(74) *Attorney, Agent, or Firm* — Harness, Dickey & Pierce, P.L.C.

(57) ABSTRACT

The present invention relates to an organic-inorganic adhesive composition, a gas barrier film comprising the same, and a method for producing the same. More particularly, the present invention can provide an organic-inorganic adhesive composition capable of improving the adhesion between an inorganic gas barrier layer and various organic materials constituting a device; a gas barrier film which has excellent gas barrier properties even with a simple two-layer structure of an inorganic layer and an organic-inorganic adhesive (Continued)

layer without a surface treatment or an undercoating layer on a substrate, and in which the organic-inorganic adhesive layer improves adhesion between the inorganic layer of the gas barrier film and the organic materials constituting the device, thereby exhibiting excellent adhesion properties, and a method for producing the same.

10 Claims, 1 Drawing Sheet

(51) Int. Cl.
| | | |
|---|---|---|
| *C08G 18/71* | (2006.01) | |
| *C09J 175/04* | (2006.01) | |
| *C09J 183/08* | (2006.01) | |
| *B32B 9/04* | (2006.01) | |
| *C09J 7/29* | (2018.01) | |
| *B32B 9/00* | (2006.01) | |
| *B32B 7/12* | (2006.01) | |
| *B32B 27/30* | (2006.01) | |
| *B32B 27/34* | (2006.01) | |
| *B32B 27/36* | (2006.01) | |
| *B32B 27/40* | (2006.01) | |
| *C08K 5/54* | (2006.01) | |
| *C08G 77/26* | (2006.01) | |

(52) U.S. Cl.
CPC .............. *B32B 27/30* (2013.01); *B32B 27/34* (2013.01); *B32B 27/36* (2013.01); *B32B 27/40* (2013.01); *C08G 18/718* (2013.01); *C09D 201/10* (2013.01); *C09J 7/29* (2018.01); *C09J 175/04* (2013.01); *C09J 183/08* (2013.01); *B32B 2307/412* (2013.01); *C08G 77/26* (2013.01); *C08K 5/54* (2013.01); *C09J 2301/408* (2020.08); *C09J 2475/00* (2013.01)

(58) Field of Classification Search
CPC .......................... C09D 183/00–183/16; C09D 201/00–201/10; C09J 175/00–175/16; C09J 183/00–183/16; C08G 77/00–77/80; C08G 18/00–18/87; C08L 75/00–75/16; C08L 83/00–83/16
See application file for complete search history.

(56) References Cited

U.S. PATENT DOCUMENTS

| 2002/0037964 A1 | 3/2002 | Miyata et al. |
| 2007/0179236 A1* | 8/2007 | Landon .................. B82Y 30/00 524/445 |
| 2012/0328888 A1* | 12/2012 | Kinzelmann ........ C08G 18/289 428/458 |

FOREIGN PATENT DOCUMENTS

| JP | 2012-030484 A | 2/2012 |
| JP | 2012-223919 A | 11/2012 |
| JP | 2015-229738 A | 12/2015 |
| KR | 10-2002-0013437 A | 2/2002 |
| KR | 10-2009-0107446 A | 10/2009 |
| KR | 10-2013-0091281 A | 8/2013 |
| KR | 10-1574705 B1 | 12/2015 |
| WO | WO-2010-083242 A1 | 7/2010 |
| WO | WO-2012-064971 A1 | 5/2012 |
| WO | WO-2014-190151 A1 | 11/2014 |

OTHER PUBLICATIONS

Chinese Office Action, dated Oct. 11, 2019, issued in corresponding Chinese Application No. CN201680078174.7, with English Translation.
Extended European Search Report, dated Oct. 11, 2019, issued in corresponding European Patent Application No. EP 16884063.5.
Japanese Office Action, dated Jul. 25, 2019, issued in corresponding Japanese Patent Application No. JP2018535057 with English translation.
XP002793146—Database WPI, Week 200174, Thomson Scientific, London, GB: AN 2001-641771.
International Search Report from corresponding PCT Application No. PCT/KR2016/015595, dated May 8, 2017, and it's English translation.
Office Action from corresponding EP Application No. 16 884 063.5, dated Mar. 11, 2020.

* cited by examiner

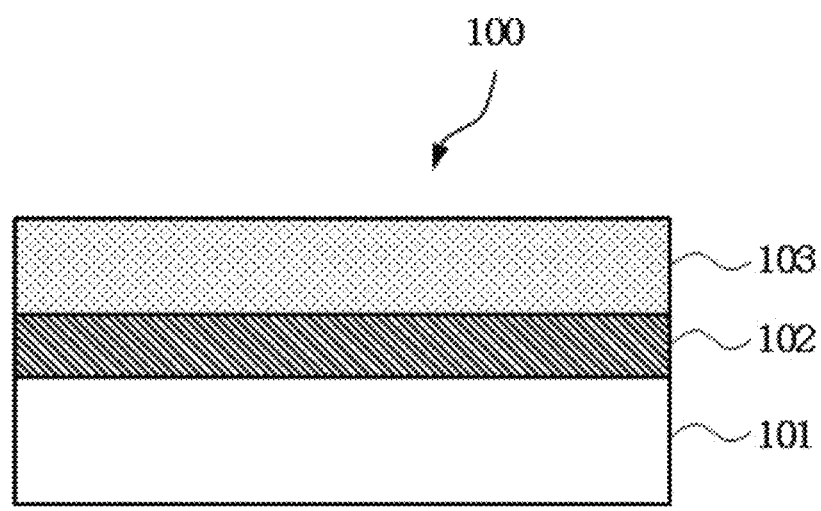

ORGANIC-INORGANIC ADHESIVE COMPOSITION AND GAS BARRIER FILM AND METHOD FOR PRODUCING SAME

CROSS-REFERENCE TO RELATED APPLICATIONS

This application is a national phase application of PCT Application No. PCT/KR2016/015595, filed on 30 Dec. 2016, which claims benefit of Korean Patent Application No. 10-2016-0002674, filed 8 Jan. 2016. The entire disclosure of the applications identified in this paragraph are incorporated herein by reference.

FIELD

The following description relates to an organic-inorganic adhesive composition, a gas barrier film including the same, and a method for producing the same. More particularly, the present invention relates to an organic-inorganic adhesive composition, a gas barrier film including the same, and a method for producing the same, which may have excellent gas barrier properties even only with an inorganic gas barrier layer and a transparent organic-inorganic adhesive layer formed by coating an organic-inorganic adhesive composition on a substrate, and may improve adhesion between the inorganic gas barrier layer and various organic materials.

BACKGROUND

With the development of a display technology using an Organic Light Emitting Diode (OLED), an inorganic light-emitting body (QD), an organic light-emitting body (OD), and the like, there is an increasing need for a gas barrier film for use in a display device. As the gas barrier film for a display device generally requires high gas barrier properties, the film is mainly formed in a multi-layer structure by alternately laminating an organic layer and an inorganic layer on a flexible film substrate. In the multi-layer gas barrier film, the inorganic layer mainly serves as a gas barrier layer, and the organic layer performs functions of: planarizing a surface of a layer on which the inorganic layer is to be laminated; improving adhesion between a substrate and the inorganic layer; and improving gas barrier properties of the inorganic layer by filling defective portions such as a crack, a pinhole, or the like.

The multi-layer gas barrier film has an advantage in that a desired level of gas barrier properties may be achieved by adjusting the number of inorganic layers and organic layers. However, the multi-layer gas barrier film also has disadvantages in that as the number of layers increases, transparency is reduced, and internal cracks may be caused by a difference in thermal expansion coefficient due to an increase in layer thickness; and production costs increase as a production yield rate is reduced. Furthermore, the multi-layer gas barrier film has a problem in that most multi-layer gas barrier films require to use an adhesive agent according to a purpose of use for adhesion with a display device, or require a functional layer which may be adhered to a display device, thereby inevitably increasing the number of layers of the gas barrier film.

Accordingly, in this respect, it is useful to develop a gas barrier film having a functional layer, which may be combined to constituent materials of a device, while having sufficient gas barrier properties even in a simple layer structure instead of a multi-layer structure.

SUMMARY

Technical Problem

The present invention has been made to solve the above problems, and it is an object of the present invention to provide an organic-inorganic adhesive composition capable of improving adhesion between an inorganic gas barrier layer and various organic materials used in a device.

Further, it is another object of the present invention to provide a gas barrier film having excellent barrier properties and high transparency with a simple layer structure on a substrate which includes an organic-inorganic adhesive composition, and a method for producing the same.

The above and other objects and advantages of the invention will become apparent from the following detailed description of preferred embodiments.

Technical Solution

In accordance with one aspect of the present invention, the above object is accomplished by providing an organic-inorganic adhesive composition containing a silane compound and an isocyanate-based compound.

Here, the silane compound may be a silane having at least one or more functional groups selected from a group consisting of a vinyl group, an epoxy group, a methacryloxy group, an acryloxy group, an amino group, and an isocyanate group.

The isocyanate-based compound may preferably include at least one or more selected from a group consisting of a monomer, an oligomer, or a polymer which has an isocyanate group.

In accordance with another aspect of the present invention, the above object is also accomplished by providing a gas barrier film formed by sequentially laminating: a transparent substrate; an inorganic gas barrier layer; and a transparent organic-inorganic adhesive layer formed by coating the organic-inorganic adhesive composition.

Here, the transparent organic-inorganic adhesive layer may form a siloxane bond with the inorganic gas barrier layer.

The transparent organic-inorganic adhesive layer may preferably include a functional group capable of reacting with an organic material.

The functional group may preferably include at least one or more selected from a group consisting of a hydroxy group, a carboxyl group, an acrylic group, an isocyanate group, an amine group, an amide group, a urea group, an epoxy group, and a thiol group.

The transparent organic-inorganic adhesive layer may preferably have a thickness of from 0.05 μm to 10 μm.

The inorganic gas barrier layer may be preferably made of at least one selected from a group consisting of a metal including Si, Al, Ti, Zr, and Ta, or a metal oxide, a metal nitride, or a metal oxynitride which includes the metal.

The inorganic gas barrier layer may preferably have a thickness of from 5 nm to 200 nm.

The transparent substrate may be a single-layer or a multi-layer structure including at least one or more selected from a group consisting of polyethylene terephthalate, polyethylene naphthalate, polyarylate, polycarbonate, polyetherimide, polyamide-imide, polyimide, and polybenzoxazole.

In accordance with yet another aspect of the present invention, the above object is also accomplished by providing a method for producing a gas barrier film, the method comprising: providing a transparent substrate; forming an inorganic gas barrier layer on one surface of the transparent substrate; producing the organic-inorganic adhesive composition; and forming a transparent organic-inorganic adhesive layer by printing or coating the organic-inorganic adhesive composition on the inorganic gas barrier layer.

Advantageous Effects

According to the present invention, the present invention has effects in that excellent gas barrier properties may be achieved even with a simple two-layer structure of an inorganic layer and an organic-inorganic adhesive layer without a surface treatment or an undercoating layer on a substrate; and the organic-inorganic adhesive layer may improve adhesion between the inorganic layer of the gas barrier film and organic materials used in a device, thereby achieving excellent adhesion properties.

However, the effects of the present invention are not limited to the aforesaid, and other objects not described herein will be clearly understood by those skilled in the art from the following description.

BRIEF DESCRIPTION OF THE DRAWINGS

FIG. 1 is a cross-sectional diagram schematically illustrating a gas barrier film according to preferred embodiments of the present invention.

DETAILED DESCRIPTION

Hereinafter, the configuration and effects of the present invention will be described in further detail with reference to Examples and Comparative Examples. However, it should be understood that these examples are provided for more specific illustration of the present invention and are not to be construed as limiting the scope of the present invention.

EXAMPLES

Example 1

An inorganic gas barrier layer was formed by using a polyethylene terephthalate (PET) film (U48, thickness: 100 μm) as a transparent substrate, and by laminating a silicon oxide (SiOx) film having a thickness of 50 nm on a surface of the PET film using a sputtering method.

An organic-inorganic adhesive composition for forming an organic-inorganic adhesive layer was produced as follows.

After mixing 124 g of alkoxysilane oligomer (KR-513 from Shin-Etsu Chemical Co., Ltd.) as a silane compound and 7.4 g of formic acid as an acid catalyst with a solvent composed of a mixture of 372 g of isopropyl alcohol (IPA) and 124 g of DI water (Daejung Chemicals & Metals Co., Ltd.), the resultant mixture was stirred at 150 rpm for three hours. Then, 313.7 g of IPA was added to the resultant mixture, followed by stirring at 150 rpm for 30 minutes, to prepare a first mixed solution. Thereafter, 93.6 g of the first mixed solution and 7.2 g of 3-aminopropyltrimethoxysilane (KBM-903 from Shin-Etsu Chemical Co., Ltd.) were mixed with 180 g of IPA, followed by stirring at 150 rpm for 10 minutes, and then 36 g of DI water was added to the mixture and was stirred again at 150 rpm for 10 minutes. After adding, to the resultant mixture, 162 g of a diluted solution obtained by diluting an isocyanate-based compound (CAT-45 from SAMWON CO., LTD.) with an IPA solvent at a weight ratio of 1:5, the mixture was stirred at 150 rpm for 30 minutes, to prepare a final organic-inorganic adhesive composition.

After bar-coating a top surface of the inorganic gas barrier layer with the prepared organic-inorganic adhesive composition, followed by heat-curing at 130° C. for one minute, a transparent organic-inorganic adhesive layer having a thickness of 0.5 μm was formed to produce a gas barrier film.

Example 2

A gas barrier film was produced in the same manner as Example 1 except that instead of a silicon oxide (SiOx) film, an aluminum oxide ($Al_2O_3$) film having a thickness of 15 nm was laminated to form an inorganic gas barrier layer using chemical vapor deposition (CVD).

Example 3

A gas barrier film was produced in the same manner as Example 1 except that instead of using alkoxysilane oligomer (KR-513 from Shin-Etsu Chemical Co., Ltd.) as a silane compound, 3-methacryloxypropyltrimethoxysilane (KBM-5103 from Shin-Etsu Chemical Co., Ltd.) was used in the same amount as alkoxysilane oligomer.

Comparative Example 1

A gas barrier film was produced in the same manner as Example 1 except that an organic-inorganic adhesive layer was not formed.

Comparative Example 2

A gas barrier film was produced in the same manner as Example 3 except that a diluted solution of an isocyanate-based compound was not added.

By using the gas barrier films produced in the Examples 1 to 3 and Comparative Examples 1 and 2, and based on the following Experimental Examples, properties were measured and the result thereof is shown in the following Table 1.

Experimental Examples

Experimental Example 1

A water vapor transmission rate (WVTR) was measured for the gas barrier film having the formed organic-inorganic adhesive layer in the Examples 1 and 3 and the Comparative Example 1. The WVTR was measured by using equipment, manufactured by MOCON Inc., at 38° C. and a relative humidity of 100% in a thickness direction of the film, and the result thereof is shown below in Table 1.

TABLE 1

| | Example 1 | Example 3 | Comparative Example 1 |
|---|---|---|---|
| Water vapor transmission rate ($g/m^2/day$) | 0.004 | 0.006 | 0.05 |

As shown in Table 1, it can be confirmed that the organic-inorganic adhesive layer formed on a top surface of the inorganic gas barrier layer may improve gas barrier properties of the gas barrier film.

Experimental Example 2

Adhesion was measured between the organic-inorganic adhesive layer and the inorganic gas barrier layer for the gas barrier film of the Examples 1 to 3 and the Comparative Example 2. The adhesion was measured after treatments were performed respectively at room temperature and at high temperature and high humidity (at 60° C. and a relative humidity of 90% for 96 hours). The adhesion was evaluated according to ASTM D3359-02 by applying and vertically removing a tape over X-cuts made in the coated surface, and using relative values according to a degree of peeling-off of the tape. The result thereof is shown below in Table 2 (5B: 0%, 4B: less than 5%, 3B: less than 15%, 2B: less than 35%, 1B: less than 65%, and 0B: 65% or more).

TABLE 2

|  | Example 1 | Example 2 | Example 3 | Comparative Example 2 |
|---|---|---|---|---|
| Adhesion at room temperature | 5B | 5B | 5B | 5B |
| Adhesion after treatment at high temperature and high humidity | 5B | 5B | 5B | 1B |

As shown in Table 2, it can be seen that there is no change in the adhesion between the inorganic gas barrier layer and the organic-inorganic adhesive layer containing an isocyanate-based compound even after treatment was performed at high temperature and high humidity.

Experimental Example 3

Adhesion was measured between organic materials and the organic-inorganic adhesive layer for the gas barrier film of the Examples 1 to 3 and the Comparative Example 2, or between organic materials and the inorganic gas barrier layer for the gas barrier film of Comparative Example 1. Adhesion was evaluated in the following manner: a top surface of the organic-inorganic adhesive layer or a top surface of the inorganic gas barrier layer (Comparative Example 1) was bar-coated with a UV curable acrylic solution (OPSTAR Z7535 from JSR Corporation), and then was UV-cured at 200 mJ/cm² to form an organic layer having a thickness of 50 µm; and adhesion was evaluated after treatments were performed respectively at room temperature and at high temperature and high humidity in the same manner as the Experimental Example 2. The result thereof is shown below in Table 3.

TABLE 3

|  | Example 1 | Example 2 | Example 3 | Comparative Example 1 | Comparative Example 2 |
|---|---|---|---|---|---|
| Adhesion at room temperature | 5B | 5B | 5B | 0B | 5B |
| Adhesion after treatment at high temperature and high humidity | 5B | 5B | 5B | 0B | 0B |

As shown in Table 3, it can be confirmed that the gas barrier film (Comparative Example 1), which has only the inorganic gas barrier layer without the organic-inorganic adhesive layer, shows very poor adhesion. In addition, there is no change in the adhesion between organic materials and the organic-inorganic adhesive layer containing an isocyanate-based compound even after treatment was performed at high temperature and high humidity.

MODE FOR INVENTION

Hereinafter, the present invention will be described in detail with reference to examples and drawings. It should be understood by one of ordinary skill in the art that these examples are provided only for more specific illustration of the present invention and are not to be construed as limiting the scope of the present invention.

Unless otherwise defined, all technical and scientific terms used herein have the same meanings as commonly understood by one of ordinary skill in the art to which this invention belongs. In case of conflict, the present specification, including definitions, will control. Although any methods and materials similar or equivalent to those described herein can be used in the practice or testing of embodiments of the present invention, preferred methods and materials are described herein.

According to an aspect of the present invention, the organic-inorganic adhesive composition contains a silane compound and an isocyanate-based compound.

The silane compound contained in the organic-inorganic adhesive composition is a silane having a functional group selected from a group consisting of a vinyl group, an epoxy group, a methacryloxy group, an acryloxy group, an amino group, and an isocyanate group. The silane compound may be a monomer, examples of which include vinyltrimethoxysilane, vinyltriethoxysilane, 3-glycidoxypropyl methyldimethoxysilane, 3-glycidoxypropyl methyldiethoxysilane, 3-glycidoxypropyl trimethoxysilane, 3-glycidoxypropyl triethoxysilane, 3-methacryloxypropyl methyldimethoxysilane, 3-methacryloxypropyl methyl diethoxysilane, 3-methacryloxypropyl trimethoxysilane, 3-methacryloxypropyl triethoxysilane, 3-acryloxypropyl trimethoxysilane, n-(2-aminoethyl)-3-aminopropylmethyldimethoxysilane, n-2-(aminoethyl)-3-aminopropyltriethoxysilane, 3-aminopropyltrimethoxysilane, 3-aminopropyltriethoxysilane, 3-isocyanatopropyltriethoxysilane, and the like, or may be an oligomer or a polymer having a combination of at least one or more of the silanes. The organic-inorganic adhesive composition may contain one or a combination of two or more of the silane compounds.

The organic-inorganic adhesive composition may contain an acid as a catalyst to accelerate a hydrolysis reaction of the silane compound. Examples of the acid may include hydrochloric acid, nitric acid, sulfuric acid, formic acid, acetic acid, and the like, but the acid is not limited thereto.

The isocyanate-based compound contained in the organic-inorganic adhesive composition may be a monomer, an oligomer, or a polymer which has an isocyanate group, and the organic-inorganic adhesive composition may contain one or a combination of two or more isocyanate-based compounds.

The organic-inorganic adhesive composition may further contain, if necessary, a monomer, an oligomer, or a polymer which has a chemical functional group, e.g., a vinyl group, a hydroxy group, a carboxyl group, an acrylic group, an isocyanate group, an amine group, an amide group, a urea group, an epoxy group, a thiol group, and the like.

In addition, the organic-inorganic adhesive composition may contain one or more organic solvents. Examples of the organic solvent include alcohol, ketone, toluene, hexane, benzene, and the like, but the organic solvent is not limited thereto.

According to another aspect of the present invention, as shown in FIG. 1, the gas barrier film 100 is formed by sequentially laminating a transparent substrate 101, an inorganic gas barrier layer 102, and a transparent organic-inorganic adhesive layer 103 formed by coating the above-described organic-inorganic adhesive composition.

The transparent organic-inorganic adhesive layer may be formed by printing or coating a top surface of the inorganic gas barrier layer with the organic-inorganic adhesive composition, followed by heat-curing.

Further, the transparent organic-inorganic adhesive layer may be formed by further adding a photoinitiator to the organic-inorganic adhesive composition according to a purpose, followed by UV curing.

In the transparent organic-inorganic adhesive layer, when the organic-inorganic adhesive composition is heat-cured or UV-cured on the top surface of the inorganic gas barrier layer, the silane compound and the isocyanate-based compound, which are contained in the composition, react with each other to form a cross-linking chemical bonding; and by a condensation reaction between the silane compound, contained in the composition, and a hydroxy group on the surface of the inorganic gas barrier layer, the transparent organic-inorganic adhesive layer may form a siloxane bond with the inorganic gas barrier layer. The transparent organic-inorganic adhesive layer formed in this manner exhibits a high degree of cure, and high adhesion with the inorganic gas barrier layer.

Further, the transparent organic-inorganic adhesive layer may have a functional group of the silane compound, a functional group of the isocyanate-based compound, a functional group formed by a chemical reaction between the silane compound and the isocyanate-based compound, and the like. Examples of the functional group may include a hydroxy group, a carboxyl group, an acrylic, an isocyanate group, an amine group, an amide group, a urea group, an epoxy group, a thiol group, and the like, and the functional group may serve to improve adhesion between the transparent organic-inorganic adhesive layer and organic materials of a display device.

The transparent organic-inorganic adhesive layer may be used as a protective layer to protect the inorganic gas barrier layer. Moreover, the organic-inorganic adhesive composition may fill a defective portion, such as a pinhole, a crack, or the like, of the inorganic gas barrier layer, such that the transparent organic-inorganic adhesive layer, formed by curing, may also be used to improve gas barrier properties of the gas barrier film.

The transparent organic-inorganic adhesive layer may have a thickness of from 0.05 μm to 10 μm, and preferably from 0.5 μm to 5 μm. In the case where the thickness of the organic-inorganic adhesive layer is less than 0.05 μm, there is a drawback in that adhesion of the organic-inorganic adhesive layer is not sufficient, thereby causing delamination of an inorganic layer or an organic layer; and in the case where the thickness of the organic-inorganic adhesive layer is greater than 10 μm, there is a drawback in that flexibility of the gas barrier film is reduced.

In the gas barrier film according to an embodiment of the present invention, the inorganic gas barrier layer laminated on one surface of the transparent organic-inorganic adhesive layer may be made of various materials such as a metal, a metal oxide, a metal nitride, a metal carbide, or a metal oxynitride. The inorganic gas barrier layer may be made of, for example, a metal including Si, Al, Ti, Zr, and Ta, or a metal oxide, a metal nitride, or a metal oxynitride which includes the metal, but the layer is not limited thereto, and may be preferably made of silicon oxide and aluminum oxide.

The inorganic gas barrier layer may be formed in various manners, examples of which include sputtering, electron beam evaporation, chemical vapor deposition (CVD), plasma enhanced chemical deposition, plating, and the like, and it is preferred to use sputtering, electron beam evaporation, or chemical vapor deposition (CVD).

As the thickness of the inorganic gas barrier layer is increased, gas barrier properties are improved, but in the case where the thickness is increased to greater than or equal to a predetermined thickness, optical properties are reduced and flexibility is lowered, thereby causing cracks in the layer. Accordingly, the thickness of the gas barrier layer may be in a range of 5 nm to 200 nm, and preferably in a range of 5 nm to 100 nm.

In the gas barrier film according to an embodiment of the present invention, a transparent substrate laminated on one surface of the inorganic gas barrier layer may be a transparent flexible polymer film, examples of which may include polyethylene terephthalate, polyethylene naphthalate, polyarylate, polycarbonate, polyetherimide, polyamide-imide, polyimide, polybenzoxazole, but the film is not limited thereto, and may be preferably polyethylene terephthalate. The transparent substrate may be a single-layer or a multi-layer structure.

A water vapor transmission rate of the gas barrier film according to an embodiment of the present invention is less than or equal to 0.1 $g/m^2/day$, and preferably less than or equal to 0.05 $g/m^2/day$.

According to yet another aspect of the present invention, a method for producing a gas barrier film includes: providing a transparent substrate; forming an inorganic gas barrier layer on one surface of the transparent substrate; producing the above-described organic-inorganic adhesive composition; and forming a transparent organic-inorganic adhesive layer by printing or coating the organic-inorganic adhesive composition on the inorganic gas barrier layer.

While only several of various embodiments, performed by the inventors of the present invention, have been shown and described, the technical spirit of the present invention is not restricted or limited by these embodiments, and it should be understood that the present invention may be modified and implemented in various ways by those skilled in the art.

What is claimed is:

1. An organic-inorganic adhesive composition comprising a silane compound having an acryloxy group, a silane compound having an amino group, isopropyl alcohol, deionized water, and an isocyanate-based compound,
    wherein the isocyanate-based compound comprises at least one or more selected from a group consisting of a monomer, an oligomer, or a polymer which has an isocyanate group,
    wherein the silane compound having an acryloxy group is 3-methacryloxypropyltrimethoxysilane, and
    wherein the silane compound having an amino group is 3-aminopropyltrimethoxysilane.

2. A gas barrier film formed by sequentially laminating:
    a transparent substrate;
    an inorganic gas barrier layer; and
    a transparent organic-inorganic adhesive layer formed by coating the organic-inorganic adhesive composition according to claim 1.

3. The gas barrier film of claim 2, wherein the transparent organic-inorganic adhesive layer forms a siloxane bond with the inorganic gas barrier layer.

4. The gas barrier film of claim 2, wherein the transparent organic-inorganic adhesive layer comprises a functional group capable of reacting with an organic material.

5. The gas barrier film of claim 4, wherein the functional group comprises at least one or more selected from a group consisting of a hydroxy group, a carboxyl group, an acrylic group, an isocyanate group, an amine group, an amide group, a urea group, an epoxy group, and a thiol group.

6. The gas barrier film of claim 2, wherein the transparent organic-inorganic adhesive layer has a thickness of from 0.05 µm to 10 µm.

7. The gas barrier film of claim 2, wherein the inorganic gas barrier layer is made of at least one metal selected from a group consisting Si, Al, Ti, Zr, and Ta, or a metal oxide, a metal nitride, or a metal oxynitride which includes the metal.

8. The gas barrier film of claim 2, wherein the inorganic gas barrier layer has a thickness of from 5 nm to 200 nm.

9. The gas barrier film of claim 2, wherein the transparent substrate is a single-layer or a multi-layer structure comprising at least one or more selected from a group consisting of polyethylene terephthalate, polyethylene naphthalate, polyarylate, polycarbonate, polyetherimide, polyimide-imide, polyimide, and polybenzoxazole.

10. The gas barrier film of claim 2, wherein the transparent substrate is selected from the group consisting of polyarylate, poly-amide-imide, and polybenzoxazole.

\* \* \* \* \*